United States Patent Office 3,098,709
Patented July 23, 1963

3,098,709
FLUORINATION OF OXIDIC NUCLEAR FUEL
William J. Mecham, Hinsdale, and John D. Gabor, Cicero, Ill., assignors to the United States of America as represented by the United States Atomic Energy Commission
No Drawing. Filed Oct. 26, 1961, Ser. No. 147,997
12 Claims. (Cl. 23—14.5)

This invention deals with the direct preparation of uranium hexafluoride and/or plutonium hexafluoride from uranium dioxide and/or plutonium dioxide, and the process is particularly intended for the processing of spent nuclear fuels for the separation of the fissionable material from fission products.

Uranium dioxide fuel is used, for instance, for nuclear power reactors mostly in the form of dense pellets that are clad or covered with a zirconium-base metal.

Uranium dioxide has been fluorinated directly with fluorine gas but, on account of the highly exothermic reaction, the fluorine had to be diluted with an inert gas, such as nitrogen, to make the reaction less hazardous and to reduce corrosion to a minimum. The hexafluorides of uranium and plutonium are volatilized in this process, while the fission products mostly remain in the form of a residue.

It is an object of this invention to provide a process for the fluorination of oxidic nuclear fuel in which the reaction rate is increased.

It is another object of this invention to provide a process for the fluorination of oxidic nuclear fuel in which an especially high utilization of the introduced fluorine gas is obtained.

It is finally an object of this invention to provide a process for the fluorination of oxidic nuclear fuel wherein overheating of the reactor vessel does not occur.

It has been found that if oxygen is added to the fluorine gas as a diluent, a considerably faster reaction rate is obtained than with nitrogen as the diluent. Also, against all expectation, it was discovered that the oxygen does not increase the temperature in the reactor vessel. The oxygen apparently plays the part of a catalyst, since it is not consumed during the reaction.

The process of this invention thus comprises contacting neutron-bombarded uranium dioxide containing plutonium oxide and fission product oxides with fluorine-oxygen gas at elevated temperature, whereby the uranium oxide and plutonium oxide are converted to the hexafluorides and are volatilized as such, while the fission products predominantly remain in solid form.

Prior to the fluorination reaction, the fuel pellets or other bodies have to be treated for the removal of the zirconium cladding. This can be done by any means known to those skilled in the art, for instance by treatment with hydrogen chloride and hydrogen fluoride.

The preferred way of carrying out the fluorination is by incorporating the uranium dioxide in a "fluidized bed" of inert material. A fluidized bed is obtained by passing a gas upwardly through a layer or bed of solid particles at a sufficient velocity to separate the particles from each other and to maintain them out of contact. In this condition a certain degree of freedom to move is imparted to the solid particles so that the solid-gas mixture behaves much like a liquid and has the ability to flow under the influence of a hydrostatic head.

For fluidization the uranium dioxide is immersed in such a bed of granular inert material, for instance of calcium fluoride, magnesium fluoride or alundum, alundum being the preferred inert material. This inert material fills the voids between the pellets and thereby improves heat transfer; it also prevents to a high degree elutriation of uranium dioxide fines. A weight ratio of about 3:1 for the inert bed material to the fuel material has been found especially satisfactory, but other quantities are also suitable.

A fluorination temperature of between 350 and 500° C. has been found operative; however, a temperature between 450 and 500° C. is best, because the reaction rate is then higher. The temperature can be readily adjusted by controlling the fluorine flow rate. The concentration of oxygen should be at least 10% by volume. The reaction can then be well controlled for fluorine concentrations up to 50 volume percent. The fluorine-containing gas mixture is passed through the apparatus at about atmospheric pressure.

When a temperature between 450 and 500° C. is desired, it is difficult to adjust the temperature by outside cooling. Therefore at this higher range it is often advantageous to add some nitrogen gas as a secondary diluent to the fluorine-oxygen mixture.

Any apparatus known to those skilled in the art for carrying out reactions between solids and gases can be used for the process of this invention. As has been mentioned before, the fluidized bed is the preferred means of reacting the fuel; it is described and patented in assignee's Patent No. 2,911,290, granted to Albert A. Jonke et al. on November 3, 1959.

In the following, a few examples are given to illustrate the process of this invention.

Example I

Calcium fluoride granules were introduced in a vertical reactor of a diameter of 3 inches that was air-cooled on the outside; the layer had a depth of 36 inches. A 6-inch layer of ½-inch diameter neutron-irradiated uranium dioxide pellets was then placed on the calcium fluoride. The total quantity of uranium dioxide was 4.5 kg. These pellets had been originally prepared by sintering in a hydrogen atmosphere.

The reactor was brought to a temperature of about 500° C. and at this temperature two parallel runs were carried out successively, one with nitrogen gas as the diluent, the other one with oxygen. In both instances the fluorine concentration in the gas mixture was 42%. The gas was introduced at a flow rate of about 0.6 ft.$^3$/min., which amounted to an average total gas rate of between 0.6 and 0.7 ft./sec. The gas was maintained at atmospheric pressure. While in the run carried out with nitrogen as the diluent 80% of the uranium dioxide had reacted after 12 hours, the same amount of the pellets had reacted in 4 hours and 48 minutes when the diluent was oxygen.

The next example illustrates the effect of temperature changes on the fluorination rate.

Example II

The same apparatus and the same conditions were used in this example as were used in Example I, except that the inert material was alundum. Eight runs were carried out at different temperatures ranging between 350 and 500° C. The modified conditions and the results are compiled in the table below.

| Temp., °C. | Gas Mixture | Total Time at Collections, hours | UF₆ Collection, g./30 minutes | UF₆ Average Total Collection Rate, g./hr. |
|---|---|---|---|---|
| 350 | 23% F₂ / 77% N₂ | 0.5 / 1.0 / 1.5 | 0 / 0 / 10 | 7 |
| 400 | 21% F₂ / 79% O₂ | 2.0 / 2.5 / 3.0 | 40 / 51 / 69 | 107 |
| 400 | 25% F₂ / 75% N₂ | 0.5 / 1.0 / 1.5 | 11 / 7 / 55 | 49 |
|  | 22% F₂ / 78% O₂ | 2.0 / 2.5 / 3.0 | 109 / 147 / 160 | 278 |
| 450 | 20% F₂ / 80% N₂ | 0.5 / 1.0 / 1.5 | 78 / 46 / 50 | 116 |
|  | 16% F₂ / 46% O₂ / 38% N₂ | 0.5 / 1.0 / 1.5 | 412 / 178 / 52 | 428 |
| 500 | 25% F₂ / 75% N₂ | 0.5 / 1.0 / 1.5 | 126 / 115 / 107 | 232 |
|  | 16% F₂ / 46% O₂ / 38% N₂ | 0.5 / 1.0 / 1.5 | 149 / 456 / 460 | 710 |

It is obvious from the above results that a temperature of 500° C. is superior to a temperature of 350° C. and also that the oxygen diluent brings about a considerably faster fluorination than does the use of nitrogen as a diluent.

It will be understood that the invention is not to be limited to the details given herein but that it may be modified within the scope of the appended claims.

What is claimed is:

1. A process of separating fissionable material from fission products present in neutron-bombarded uranium oxide fuel, comprising contacting said oxide fuel with an oxygen-fluorine gas mixture containing at least 10% by volume of oxygen at a temperature of between 350 and 500° C., whereby said fissionable material is converted to a fluoride and volatilized as such while the fission products remain as a residue and removing the volatilized fluoride from a residue.

2. A process of separating fissionable material from fission products present in neutron-bombarded uranium oxide fuel, comprising fluidizing said oxide fuel, contacting said fluidized fuel with an oxygen-fluorine gas mixture containing at least 10% by volume of oxygen at a temperature of between 350 and 500° C., whereby said fissionable material is converted to a fluoride and volatilized as such while the fission products remain as a residue and removing the volatilized fluoride from a residue.

3. A process of separating uranium and plutonium from a neutron-bombarded fission-products-containing uranium oxide material, comprising fluidizing said oxide material with an oxygen-fluorine gas mixture containing at least 10% by volume of oxygen at a temperature of between 350 and 500° C., whereby said uranium and plutonium are converted to the hexafluorides and volatilized as such while the fission products remain as a residue and removing the volatilized fluorides from a residue.

4. The process of claim 3 wherein the oxygen-fluorine gas mixture is maintained at atmospheric pressure.

5. The process of claim 3 wherein the reaction temperature is between 450 and 500° C.

6. The process of claim 5 wherein the oxygen-fluorine gas mixture also contains nitrogen.

7. The process of claim 3 wherein the gas mixture contains up to 50% by volume of fluorine.

8. The process of claim 7 wherein the oxygen-fluorine gas mixture also contains nitrogen.

9. The process of claim 3 wherein fluidization of the fuel is carried out on a bed of inert granules.

10. The process of claim 9 wherein the inert granules consist of calcium fluoride.

11. The process of claim 9 wherein the inert granules consists of alundum.

12. The process of claim 9 wherein the weight ratio of the inert material to the fuel is approximately three.

References Cited in the file of this patent
UNITED STATES PATENTS

| 2,535,572 | Hainer | Dec. 26, 1950 |
| 2,833,617 | Seaborg | May 6, 1958 |
| 2,907,630 | Lawroski et al. | Oct. 6, 1959 |
| 3,049,401 | Jonke | Aug. 4, 1962 |

FOREIGN PATENTS

| 570,912 | Belgium | Sept. 30, 1958 |

OTHER REFERENCES

Vogel et al.: "I. and E. Chem.," vol. 50, No. 12, pp. 1744–1747, December 1958.